United States Patent
Goetz-Ekkehard et al.

(10) Patent No.: US 7,485,679 B2
(45) Date of Patent: Feb. 3, 2009

(54) AQUEOUS CHROMOPHORE AND/OR EFFECT-PRODUCING COATING MATERIAL, AND USE OF THE SAME

(75) Inventors: Sapper Goetz-Ekkehard, Godshill I.O.W. (GB); Hummert Tobias, Güntersleben (DE)

(73) Assignee: BASF Coatings AG, Munster (DE)

( * ) Notice: Subject to any disclaimer, the term of this patent is extended or adjusted under 35 U.S.C. 154(b) by 596 days.

(21) Appl. No.: 10/537,070

(22) PCT Filed: Nov. 5, 2003

(86) PCT No.: PCT/EP03/12310

§ 371 (c)(1), (2), (4) Date: May 31, 2005

(87) PCT Pub. No.: WO2004/053007

PCT Pub. Date: Jun. 24, 2004

(65) Prior Publication Data

US 2006/0014857 A1 Jan. 19, 2006

(30) Foreign Application Priority Data

Dec. 9, 2002 (DE) ................. 102 57 377

(51) Int. Cl.
*C08G 18/42* (2006.01)
(52) U.S. Cl. .............. 524/500; 524/501; 524/502; 524/507; 524/589; 524/590; 524/591
(58) Field of Classification Search .......... 524/500, 524/501, 502, 507, 589, 590, 591
See application file for complete search history.

(56) References Cited

U.S. PATENT DOCUMENTS 5,270,399 A 12/1993 Czornij et al. .......... 525/327.6
5,854,332 A 12/1998 Swarup et al. .............. 524/507
6,001,915 A 12/1999 Schwarte et al. ............ 524/457
6,162,506 A 12/2000 Lettmann et al. ......... 427/407.1

FOREIGN PATENT DOCUMENTS

DE 44 37 535 4/1996
DE 197 22 862 1/1999
EP 0 589 340 9/1993

OTHER PUBLICATIONS

Süd-Chemie brand name Optigel(R)—Water Phase Optigel(R) Pure Bentonites and Modified Bentonites.

*Primary Examiner*—Edward J Cain

(57) ABSTRACT

A color and/or effect coating material which is free from rheological aids based on phyllosilicates and comprises
(A) a water-soluble, water-dilutable and/or water-dispersible polyurethane;
(B) a color and/or effect pigment;
(C) a dispersing assistant selected from the group consisting of the reaction products of
  (c1) a functionalized copolymer containing
    (c11) a copolymerized olefinically unsaturated monomer isocyanate groups, anhydride groups and epoxy groups; and
    (c12) a copolymerized olefinically unsaturated monomer which is free from isocyanate-, anhydride- and epoxy-reactive functional groups;
  (c2) at least one homopolymeric polyalkylene glycol, and
  (c3) at least one compound of the general formula I:

$$NR_2-C(O)-NR_2 \qquad (I)$$

in which the variables R are selected from the group consisting of hydrogen atoms and organic radicals, at least one of the radicals R containing at least one reactive functional group selected from the group consisting of isocyanate-, anhydride- and epoxy-reactive groups; and
(D) a rheological aid based on (meth)acrylate copolymers;
and its use to produce single-coat and multicoat color and/or effect paint systems.

13 Claims, No Drawings

AQUEOUS CHROMOPHORE AND/OR EFFECT-PRODUCING COATING MATERIAL, AND USE OF THE SAME

RELATED APPLICATIONS

This application is based on PCT/EP2003/012310 filed on 5 Nov. 2003, which claims priority to DE 102 57 377.8, filed 9 Dec. 2002.

The present invention relates to a novel polyurethane-based aqueous color and/or effect coating material and to its use to produce single-coat and multicoat color and/or effect coating systems in automotive finishing, industrial coating, including coil coating and container coating, plastics coating, the coating of interior and exterior architecture, furniture coating, and the coating of hollow glassware.

Aqueous color and/or effect coating materials, especially aqueous basecoat materials, which comprise as binder a water-dispersible, ionically or nonionically stabilized polyurethane or a water-dispersible (meth)acrylate copolymer, at least one dispersing assistant for the color and/or effect pigments, selected from the group consisting of the reaction products of (c1) at least one functionalized copolymer containing
   (c11) at least one copolymerized olefinically unsaturated monomer selected from the group consisting of olefinically unsaturated monomers containing at least one reactive functional group selected from the group consisting of isocyanate groups, anhydride groups and epoxy groups; and
   (c12) at least one copolymerized olefinically unsaturated monomer which is free from isocyanate-, anhydride- and epoxy-reactive functional groups;
(c2) at least one homopolymeric polyalkylene glycol, and
(c3) at least one compound of the general formula I:

$$NR_2-C(O)-NR_2 \qquad (I)$$

in which the variables R are selected from the group consisting of hydrogen atoms and saturated and unsaturated, substituted and unsubstituted, aliphatic, cycloaliphatic, aliphatic-cycloaliphatic, aromatic, aliphatic-aromatic and cycloaliphatic-aromatic radicals which may contain at least one amino group —NH—, at least one oxygen atom —O— and/or at least one sulfur atom —S— and/or may be cyclically linked to one another, at least one of the radicals R containing at least one reactive functional group selected from the group consisting of isocyanate-, anhydride- and epoxy-reactive groups; and phyllosilicates, especially montmorillonites, as rheology control additives, and also the color and/or effect paint systems produced from them, are known from European patent application EP 0 589 340 A1.

Aqueous color and/or effect coating materials, especially aqueous basecoat materials, which comprise a water-dispersible (meth)acrylate copolymer binder and a nonassociative Theological aid based on (meth)acrylate copolymers based on ($C_1$-$C_6$)-alkyl (meth)acrylate and (meth)acrylic acid, and also the color and/or effect paint systems produced from them, are known from German patent applications DE 197 41 554 A1 and DE 196 52 842 A1.

These known aqueous color and/or effect coating materials and the single-coat or multicoat color and/or effect paint systems produced therewith exhibit per se performance properties which are very good.

The known coating materials, however, require further improvement in terms of their shear stability on stirring and in their settling behavior on storage at room temperature and on oven storage at 40° C., so that the user, especially the automaker, no longer experiences any problems, such as loss of pseudoplasticity or phase separation, on the line.

Furthermore, it is necessary to improve further the adhesion properties of the known coatings, particularly of the paint systems, so that there is no delamination and/or blushing, particularly following exposure to condensation. These problems may occur both with the known original finishes and with the known refinishes.

It is an object of the present invention to provide novel aqueous color and/or effect coating materials which are highly suitable as aqueous basecoat material or as solid-color topcoat material for producing single-coat and multicoat color and/or effect paint systems. The novel aqueous color and/or effect coating materials ought to exceed the known coating materials in their storage stability, particularly their shear stability, and in their settling behavior. The novel single-coat or multicoat color and/or effect paint systems ought to exceed the known paint systems in terms of their adhesion properties, particularly following exposure to condensation, and this should be the case both with the original finishes and with the refinishes.

The invention accordingly provides the novel aqueous color and/or effect coating material which is free from rheological aids based on phyllosilicates and comprises (A) at least one water-soluble, water-dilutable and/or water-dispersible polyurethane selected from the group consisting of polyurethanes which are grafted with olefinically unsaturated compounds, are ionically or ionically and nonionically stabilized and are based on polyisocyanates selected from the group consisting of aliphatic, cycloaliphatic, aliphatic-cycloaliphatic, aromatic, aliphatic-aromatic and cycloaliphatic-aromatic polyisocyanates;
(B) at least one color and/or effect pigment;
(C) at least one dispersing assistant for the color and/or effect pigments, selected from the group consisting of the reaction products of
   (c1) at least one functionalized copolymer containing
      (c11) at least one copolymerized olefinically unsaturated monomer selected from the group consisting of olefinically unsaturated monomers containing at least one reactive functional group selected from the group consisting of isocyanate groups, anhydride groups and epoxy groups; and
      (c12) at least one copolymerized olefinically unsaturated monomer which is free from isocyanate-, anhydride- and epoxy-reactive functional groups;
   (c2) at least one homopolymeric polyalkylene glycol, and
   (c3) at least one compound of the general formula I:

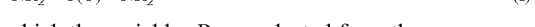

$$NR_2-C(O)-NR_2 \qquad (I)$$

in which the variables R are selected from the group consisting of hydrogen atoms and saturated and unsaturated, substituted and unsubstituted, aliphatic, cycloaliphatic, aliphatic-cycloaliphatic, aromatic, aliphatic-aromatic and cycloaliphatic-aromatic radicals which may contain at least one amino group —NH—, at least one oxygen atom —O— and/or at least one sulfur atom —S— and/or may be cyclically linked to one another, at least one organic radical R being present and the radical R or at least one of the radicals R containing at least one reactive functional group selected from the group consisting of isocyanate-, anhydride- and epoxy-reactive groups; and (D) at least one rheological aid based on (meth)acrylate copolymers.

The novel aqueous color and/or effect coating material free from rheological aids based on phyllosilicates is referred to below as "coating material of the invention".

Further subject matter of the invention will emerge from the description which follows.

In the light of the prior art it was surprising and unforeseeable for the skilled worker that the object on which the present invention was based could be achieved by means of the coating material of the invention.

A further surprise was that it was possible to do without phyllosilicate rheological aids and to use only organic rheological aids. This resulted, surprisingly, after just a short time of shearing in a comparatively weak shear field, in a coating material of the invention which had the necessary pseudoplasticity.

A further surprise was that the coating material of the invention had a better stability on storage, both on room temperature storage and on 40° C. oven storage, than the known coating materials. Not least, the shear stability had also been improved. Phase separation was no longer observed in the case of the coating material of the invention.

A particular surprise, however, was that the coatings of the invention produced from the coating material of the invention, especially the basecoats and solid-color topcoats, were free from wetting defects, runs, popping marks, pinholes, clouds, effect defects, water spots, and shifts in shade. They also met all of the requirements posed in terms of wet adhesion and stonechip resistance following exposure to constant condensation conditions and following exposure to boiling water and subsequent jetting with a high pressure steam jet, and exceeded the known coatings in this respect.

The coating material of the invention is curable thermally or both thermally and with actinic radiation. It may be thermally self-crosslinking or externally crosslinking.

In the context of the present invention, actinic radiation is electromagnetic radiation, such as near infrared (NIR), visible light, UV radiation or X-rays, especially UV radiation, and corpuscular radiation such as electron beams.

In the context of the present invention, the term "self-crosslinking" denotes the property of a binder to undergo crosslinking reactions with itself. A precondition for this is that the binder already contains both types of complementary reactive functional groups necessary for crosslinking, or reactive functional groups which react "with themselves". "Externally crosslinking", on the other hand, is used to denote those coating materials in which one type of the complementary reactive functional groups is present in the binder and the other type in a curing or crosslinking agent. For further details, reference is made to Römpp Lexikon Lacke und Druckfarben, Georg Thieme Verlag, Stuttgart, N.Y., 1998, "Curing", pages 274 to 276, especially page 275, bottom.

If the coating material of the invention is curable thermally and with actinic radiation, this is also referred to by those in the art as "dual cure".

The coating material of the invention is aqueous. This means that its constituents are present in solution and/or dispersion in water or in an aqueous medium consisting of water and minor amounts of at least one water-miscible organic solvent. "Minor amounts" here are those which do not destroy the aqueous nature of the medium.

The coating material of the invention is a one-component system.

In the context of the present invention, a one-component system is a physically curing coating material or a coating material which cures thermally, or thermally and with actinic radiation, in which the binder and the crosslinking agent are present alongside one another, i.e., in one component. The prerequisite for this is that the two constituents crosslink with one another only at relatively high temperatures and/or on exposure to actinic radiation.

The coating material of the invention is a two-component or multicomponent system.

In the context of the present invention, two-component or multicomponent systems are coating materials whose crosslinking agent, because of its high reactivity, must be stored separately from other constituents of the coating materials prior to application.

Examples of suitable complementary reactive functional groups for use in accordance with the invention are compiled in the following overview. In said overview, the variable $R^1$ is an acyclic or cyclic aliphatic, an aromatic, and/or an aromatic-aliphatic (araliphatic) radical; the variables $R^2$ and $R^3$ are identical or different aliphatic radicals or are linked with one another to form an aliphatic or heteroaliphatic ring.

Overview: Examples of Complementary Functional Groups

| binder and crosslinking agent or crosslinking agent and binder | |
|---|---|
| —SH | —C(O)—OH |
| —NH$_2$ | —C(O)—O—C(O)— |
| —OH | —NCO |
| | —NH—C(O)—OR$^1$ |
| | —CH$_2$—OH |
| | —CH$_2$—O—R$^1$ |
| | —NH—CH$_2$—O—R$^1$ |
| | —NH—CH$_2$—OH |
| | —N(—CH$_2$—O—R$^1$)$_2$ |
| | —NH—C(O)—CH(—C(O)OR$^1$)$_2$ |
| | —NH—C(O)—CH(—C(O)OR)(—C(O)—R$^1$) |
| | —NH—C(O)—NR$^2$R$^3$ |
| | >Si(OR$^1$)$_2$ |
| | 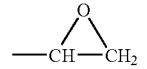 |
| | 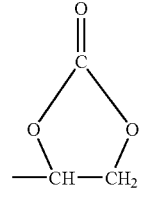 |
| —C(O)—OH | 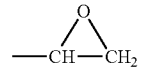 |
| | —N=C=N— |
| | —C(O)—N(CH$_2$—CH$_2$—OH)$_2$ |

The selection of the respective complementary reactive functional groups is guided firstly by the consideration that during the preparation, storage, and application of the coating materials of the invention they must not undergo any unwanted reactions, especially no premature crosslinking, and/or, if appropriate, must not disrupt or inhibit curing with actinic radiation, and secondly by the temperature range within which crosslinking is to take place.

In the case of the one-component systems of the invention, crosslinking temperatures of from 100 to 180° C. are preferably employed. Preference is therefore given to the use of binders (A) containing thio, hydroxyl, N-methylolamino, N-alkoxymethylamino and/or carboxyl groups, preferably hydroxyl groups, on the one hand and of crosslinking agents containing anhydride, carboxyl, epoxy, blocked isocyanate, methylol, methylol ether, siloxane, carbonate, amino, hydroxyl and/or beta-hydroxyalkylamide groups, preferably blocked isocyanate, or alkoxymethylamino groups, on the other.

In the case of self-crosslinking coating materials of the invention, the binders (A) contain, in particular, methylol, methylol ether and/or N-alkoxymethylamino groups.

In the case of the two-component or multicomponent systems of the invention it is preferred to employ crosslinking temperatures below 100° C. Complementary reactive functional groups used are preferably thiol, hydroxyl or primary and secondary amino groups, especially hydroxyl groups, on the one hand and isocyanate groups on the other.

The first essential constituent of the coating material of the invention is the polyurethane (A), which acts as binder. In accordance with the invention, it is selected from the group consisting of polyurethanes which are grafted with olefinically unsaturated compounds, are ionically and nonionically stabilized and are based on polyisocyanates selected from the group consisting of aliphatic, cycloaliphatic, aliphatic-cycloaliphatic, aromatic, aliphatic-aromatic and cycloaliphatic-aromatic polyisocyanates.

The polyurethane (A) is of linear, branched, or comb construction.

Viewed in terms of method, the preparation of the polyurethanes (A) for use in accordance with the invention has no special features but instead takes place, for example, as described in patents EP 0 089 497 A1, DE 197 22 862 C2, DE 196 45 761 A1, DE 43 39 870 A1, DE 197 36 535 A1, and DE 44 37 535 A1, EP 0 522 419 A1, and EP 0 522 420 A1.

In a first preferred variant of the preparation of polyurethanes (A), (a1) at least one polyisocyanate, especially a diisocyanate, and also, if desired, a monoisocyanate are reacted with
(a2) at least one polyol, especially a diol,
(a3) at least one compound having at least one anionic group and/or at least one functional group convertible to an anionic group, and at least one isocyanate-reactive functional group, or alternatively
(a4) at least one compound having at least one cationic group and/or at least one functional group convertible to a cationic group, and at least one isocyanate-reactive functional group, and also, if desired,
(a5) at least one chain extender.

In a further preferred variant of the preparation process,
(a6) at least one compound having at least one nonionic, hydrophilic group and at least one isocyanate-reactive functional group is used additionally to the compounds (a3) or (a4).

In yet a further preferred variant of the preparation process,
(a7) at least one compound having at least one olefinically unsaturated group and at least one isocyanate-reactive functional group, or alternatively
(a8) at least one compound having at least one olefinically unsaturated group and at least one isocyanate group, is additionally incorporated.

The polyurethanes (A) prepared from the above-described compounds (a1) to (a8) are grafted with olefinically unsaturated monomers (a9), to give polyurethane-(meth)acrylate graft copolymers (A).

Examples of suitable diisocyanates (a1) are isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane-2,4'-diisocyanate, trimethylene diisocyanate, tetramethylene diisocyanate, pentamethylene diisocyanate, hexamethylene diisocyanate, ethyl ethylene diisocyanate, trimethylhexane diisocyanate, heptamethylene diisocyanate or diisocyanates derived from dimeric fatty acids, as marketed under the commercial designation DDI 1410 by Henkel and described in patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobut-1-yl)cyclohexane, liquid bis(4-isocyanatocyclohexyl)methane with a trans/trans content of up to 30% by weight, preferably 25% by weight, and in particular 20% by weight, as described in patents DE 44 14 032 A1, GB 1220717 A, DE 16 18 795 A1, and DE 17 93 785 A1; tetramethylxylylidene diisocyanate (TMXDI® from CYTEC), tolylene diisocyanate, xylylene diisocyanate, bisphenylene diisocyanate, naphthylene diisocyanate or diphenylmethane diisocyanate.

Examples of suitable polyisocyanates (a1) based on the above-described diisocyanates (a1) are isocyanato-containing polyurethane prepolymers prepared by reacting polyols with an excess of at least one of the above-described diisocyanates, and/or polyisocyanates containing isocyanurate, biuret, allophanate, iminooxadiazinedione, urethane, urea and/or uretdione groups, such as are formed by catalytic oligomerization of diisocyanates using suitable catalysts. Examples of suitable polyisocyanates (A) of this kind and processes for preparing them are known, for example, from the patents and patent applications CA 2,163,591 A1, U.S. Pat. Nos. 4,419,513 A, 4,454,317 A, EP 0 646 608 A1, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. Nos. 5,258,482 A, 5,290,902 A, EP 0 649 806 A1, DE 42 29 183 A1 and EP 0 531 820 A1.

It is preferred to use polyisocyanates containing on average from 2.5 to 5 isocyanate groups per molecule and having viscosities of from 100 to 10,000, preferably from 100 to 5000 mPas. Furthermore, the polyisocyanates may have been modified hydrophilically or hydrophobically in a customary and known manner.

Very particular preference is given to the use of mixtures of polyisocyanates (a1) based on the above-described diisocyanates (a1) and containing uretdione and/or isocyanurate and/or allophanate groups.

Examples of suitable monoisocyanates (a1) are phenyl isocyanate, cyclohexyl isocyanate, stearyl isocyanate, vinyl isocyanate, methacryloyl isocyanate, and/or 1-(1-isocyanato-1-methylethyl)-3-(1-methylethenyl)benzene (TMI® from CYTEC).

Examples of suitable polyols (a2) are saturated or olefinically unsaturated polyester polyols prepared by reacting
    unsulfonated or sulfonated saturated and/or unsaturated polycarboxylic acids or their esterifiable derivatives, together if desired with monocarboxylic acids, and
    saturated and/or unsaturated polyols, together if desired with monools.

Examples of suitable polycarboxylic acids are aromatic, aliphatic, and cycloaliphatic polycarboxylic acids. It is preferred to use aromatic and/or aliphatic polycarboxylic acids.

Examples of suitable aromatic polycarboxylic acids are phthalic acid, isophthalic acid, terephthalic acid, phthalic, isophthalic or terephthalic monosulfonate, or halophthalic acids, such as tetrachloro- and tetrabromophthalic acid, among which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid, dodecanedicarboxylic acid, or dimeric fatty acids, or maleic acid, fumaric acid or itaconic acid, among which adipic acid, glutaric acid, azelaic acid, sebacic acid, dimeric fatty acids, and maleic acid are advantageous and are therefore used with preference.

Examples of suitable cycloaliphatic and cyclic unsaturated polycarboxylic acids are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid, and 4-methyltetrahydrophthalic acid. These dicarboxylic acids may be used both in their cis and in their trans form, and also as a mixture of both forms.

Also suitable are the esterifiable derivatives of the abovementioned polycarboxylic acids, such as their monoesters or polyesters with aliphatic alcohols having 1 to 4 carbon atoms or hydroxy alcohols having 1 to 4 carbon atoms, for example. Furthermore, it is also possible to use the anhydrides of the abovementioned polycarboxylic acids, where they exist.

If desired, together with the polycarboxylic acids, it is also possible to use monocarboxylic acids, such as benzoic acid, tert-butylbenzoic acid, lauric acid, isononanoic acid, fatty acids of naturally occurring oils, acrylic acid, methacrylic acid, ethacrylic acid, and crotonic acid, for example. A preferred monocarboxylic acid used is isononanoic acid.

Examples of suitable polyols are diols and triols, especially diols. Usually, triols are used in addition to the diols in minor amounts in order to introduce branching sites into the polyester polyols (a2).

Suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol, the positionally isomeric diethyloctanediols, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo [2.2.1]heptane, 2,2-diethyl-1,3-propanediol, 2,2-dipropyl-1,3-propanediol, 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-bis(2'-hydroxypropyl)benzene, and 1,3-bis(2'-hydroxypropyl) benzene. These diols may also be used per se (diols a2) to prepare the polyurethanes (A).

Of these diols, hexanediol and neopentyl glycol are particularly advantageous and are therefore used with particular preference.

Examples of suitable triols are trimethylolethane, trimethylolpropane, and glycerol, especially trimethylolpropane.

The abovementioned triols may also be used per se (triols a2; cf. patent EP 0 339 433 A1) to prepare the polyurethanes.

If desired, minor amounts of monools may also be used. Examples of suitable monools are alcohols or phenols such as ethanol, propanol, n-butanol, sec-butanol, tert-butanol, amyl alcohols, hexanols, fatty alcohols, allyl alcohol, or phenol.

The preparation of the polyester polyols (a2) may be conducted in the presence of small amounts of an appropriate solvent as entrainer. Examples of entrainers used are aromatic hydrocarbons, such as, in particular, xylene and (cyclo)aliphatic hydrocarbons, e.g., cyclohexane or methylcyclohexane.

Further examples of suitable polyols (a2) are polyester diols which are obtained by reacting a lactone with a diol. They are notable for the presence of terminal hydroxyl groups and repeating polyester units of the formula —(—CO—(CHR$^4$)$_m$—CH$_2$—O—)—. Here, the index m is preferably from 4 to 6 and the substituent R$^4$ is hydrogen or an alkyl, cycloalkyl, or alkoxy radical. No one substituent contains more than 12 carbon atoms. The total number of carbon atoms in the substituent does not exceed 12 per lactone ring. Examples are hydroxycaproic acid, hydroxybutyric acid, hydroxydecanoic acid, and/or hydroxystearic acid.

Preferred for preparing the polyester diols (a2) is the unsubstituted ε-caprolactone, where m is 4 and all substituents R$^4$ are hydrogen. The reaction with lactone is started by low molecular mass polyols such as ethylene glycol, 1,3-propanediol, 1,4-butanediol, or dimethylolcyclohexane. It is also possible to react other reaction components, such as ethylenediamine, alkyldialkanolamines, or else urea, with caprolactone. Further suitable diols of relatively high molecular mass include polylactam diols, which are prepared by reacting, say, ε-caprolactam with low molecular mass diols.

Further examples of suitable polyols (a2) are polyether polyols, especially those having a number-average molecular weight of from 400 to 5000, in particular from 400 to 3000. Examples of particularly suitable polyether diols are those of the general formula H—(—O—(CHR$^5$)$_o$—)$_p$OH, in which the substituent R$^5$ is hydrogen or a lower, unsubstituted or substituted alkyl radical, the index o is from 2 to 6, preferably from 3 to 4, and the index p is from 2 to 100, preferably from 5 to 50. Especially suitable examples are linear or branched polyether diols such as poly(oxyethylene) glycols, poly(oxypropylene) glycols, and poly(oxybutylene) glycols.

On the one hand, the polyether diols (a2) should not introduce excessive amounts of ether groups, since otherwise the coatings produced using the polyurethane-(meth)acrylate graft copolymers (A) are swollen by water. On the other hand, they may be used in amounts which contribute to stabilizing (compounds a6) the dispersions of the polyurethanes (A).

Examples of suitable functional groups for use in accordance with the invention which may be converted into anions by neutralizing agents are carboxylic acid, sulfonic acid, and phosphonic acid groups, especially carboxylic acid groups.

Examples of suitable anionic groups for use in accordance with the invention are carboxylate, sulfonate, and phosphonate groups, especially carboxylate groups.

Examples of suitable neutralizing agents for functional groups convertible into anions are ammonia, ammonium salts, such as ammonium carbonate or ammonium hydrogen carbonate, for example, and amines, such as trimethylamine, triethylamine, tributylamine, dimethylaniline, diethylaniline, triphenylamine, dimethylethanolamine, diethylethanolamine, methyldiethanolamine, triethanolamine, and the like, for example. Neutralization may take place in organic or aqueous phase. Preference is given to the use of dimethylethanolamine as a neutralizing agent.

(Potentially) anionic groups are introduced into the polyurethane molecules by way of the incorporation of compounds (a3) which contain in the molecule at least one isocyanate-reactive group and at least one, especially one, group capable of forming anions; the amount to be used may be calculated from the target acid number.

Suitable isocyanate-reactive functional groups are, in particular, hydroxyl groups, thiol groups, and primary and/or secondary amino groups, of which the hydroxyl groups are used with preference.

Very suitable compounds (a3) are those containing two groups in the molecule which are reactive toward isocyanate groups. Accordingly it is possible to use, for example, alkanoic acids having two substituents on the α carbon atom. The substituent may be a hydroxyl group, an alkyl group, or, preferably, an alkylol group. These alkanoic acids have at least one, generally from 1 to 3, carboxyl group(s) in the molecule. They have 2 to about 25, preferably 3 to 10, carbon atoms. Examples of suitable alkanoic acids are dihydroxypropionic acid, dihydroxysuccinic acid, and dihydroxybenzoic acid. A particularly preferred group of alkanoic acids comprises the α,α-dimethylolalkanoic acids of the general formula $R^6$—$C(CH_2OH)_2COOH$, where $R^6$ is a hydrogen atom or an alkyl group having up to about 20 carbon atoms. Examples of especially suitable alkanoic acids are 2,2-dimethylolacetic acid, 2,2-dimethylolpropionic acid, 2,2-dimethylolbutyric acid, and 2,2-dimethylolpentanoic acid. The preferred dihydroxyalkanoic acid is 2,2-dimethylolpropionic acid. Examples of compounds containing amino groups are α,ω-diaminovaleric acid, 3,4-diaminobenzoic acid, 2,4-diaminotoluenesulfonic acid, and 2,4-diaminodiphenyl ether sulfonic acid.

Examples of suitable functional groups for use in accordance with the invention that may be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups for use in accordance with the invention are primary, secondary, tertiary or quaternary ammonium groups, tertiary sulfonium groups or quaternary phosphonium groups, preferably quaternary ammonium groups or tertiary sulfonium groups, but especially tertiary ammonium groups.

Examples of suitable neutralizing agents for functional groups convertible into cations are organic and inorganic acids such as sulfuric acid, hydrochloric acid, phosphoric acid, formic acid, acetic acid, lactic acid, dimethylolpropionic acid, and citric acid.

(Potentially) cationic groups are introduced into the polyurethanes (A) via the incorporation of compounds (a4) which contain at least one, especially two, isocyanate-reactive groups and at least one group capable of forming cations in the molecule; the amount to be used may be calculated from the target amine number.

Suitable isocyanate-reactive functional groups are those described above.

Examples of suitable compounds (a4) are 2,2-dimethylolethyl- or -propylamine blocked with a ketone, the resulting ketoxime group being hydrolyzed again prior to the formation of the cationic group, or N,N-dimethyl-, N,N-diethyl- or N-methyl-N-ethyl-2,2-dimethylolethyl- or -propylamine.

The total amount of neutralizing agent used in the coating material of the invention is chosen so that from 1 to 100 equivalents, preferably from 50 to 90 equivalents, of the potentially anionic or cationic functional groups of the polyurethane (A) are neutralized.

Polyols, polyamines and amino alcohols (a5) may be used for chain extension.

Suitable polyols (a5) for the chain extension are polyols having up to 36 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A, or mixtures thereof (cf. patents EP 0 339 433 A1, EP 0 436 941 A1 or EP0 517 707 A1).

Examples of suitable polyamines (a5) have at least two primary and/or secondary amino groups. Polyamines (a5) are essentially alkylenepolyamines having 1 to 40 carbon atoms, preferably about 2 to 15 carbon atoms. They may carry substituents which have no hydrogen atoms that are reactive with isocyanate groups. Examples are polyamines (a5) having a linear or branched aliphatic, cycloaliphatic or aromatic structure and at least two primary amino groups.

Appropriate diamines (a5) are hydrazine, ethylenediamine, propylenediamine, 1,4-butylenediamine, piperazine, 1,4-cyclohexyldimethylamine, 1,6-hexamethylenediamine, trimethylhexamethylenediamine, menthanediamine, isophoronediamine, 4,4'-diaminodicyclohexylmethane, and aminoethylethanolamine. Preferred diamines (a5) are hydrazine, alkyl- or cycloalkyldiamines such as propylenediamine and 1-amino-3-aminomethyl-3,5,5-trimethylcyclohexane.

It is also possible to use polyamines (a5), which contain more than two amino groups in the molecule. In these cases, however, it should be ensured—by using monoamines (a5) as well, for example—that crosslinked polyurethane resins (A) are not obtained. Polyamines (a5) of this kind which may be used are diethylenetriamine, triethylenetetramine, dipropylenediamine, and dibutylenetriamine. An example of a monoamine is ethylhexylamine (cf. patent EP-A-0 089 497).

Examples of suitable amino alcohols (a5) are ethanolamine and diethanolamine.

Examples of suitable compounds (a6) by means of which hydrophilic nonionic functional groups are introduced into the polyurethanes (A) are the above-described polyether diols or alkoxypoly(oxyalkylene) alcohols with the general formula $R^7O$—(—$CH_2$—$CHR^8$—O—)$_r$H in which $R^7$ is an alkyl radical having 1 to 6 carbon atoms, $R^8$ is a hydrogen atom or an alkyl radical having 1 to 6 carbon atoms, and the index r is a number between 20 and 75 (cf. patents EP 0 354 261 A1 and EP0 424 705 A1).

The polyurethanes (A) may contain terminal and/or lateral olefinically unsaturated groups. Groups of this kind are introduced with the aid of compounds (a7) having at least one, especially two, isocyanate-reactive group(s), especially hydroxyl groups, and at least one, especially one, olefinically unsaturated group. However, it is also possible to use compounds (a8) containing at least one isocyanate group and at least one, especially one, olefinically unsaturated group. Preference is given to the compounds (a7).

Suitable olefinically unsaturated groups are basically all groups which contain at least one, especially one, double bond. In the context of the present invention, a double bond is a carbon-carbon double bond. Examples of highly suitable olefinically unsaturated groups are (meth)acrylate, ethacrylate, crotonate, cinnamate, vinyl ether, vinyl ester, vinyl, dicyclopentadienyl, norbornenyl, isoprenyl, isopropenyl, allyl and/or butenyl groups; dicyclopentadienyl ether, norbornenyl ether, isoprenyl ether, isopropenyl ether, allyl ether or butenyl ether groups; and/or dicyclopentadienyl ester, norbornenyl ester, isoprenyl ester, isopropenyl ester, allyl ester and/or butenyl ester groups.

Examples of suitable compounds (a7) and (a8) are trimethylolpropane monoallyl ether or trimethylolpropane mono (meth)acrylate (a7) or 1-(1-isocyanato-1-methylethyl)-3-(1-methylethenyl)benzene (i.e., dimethyl-m-isopropenylbenzyl isocyanate) (a8), especially trimethylolpropane monoallyl ether (a7).

The above-described compounds (a7) and (a8) are preferably used in amounts such as to give polyurethanes (A) having on average at least 0.5, preferably at least 1, and in particular at least 1.5, olefinically unsaturated double bond(s) in the molecule.

The polyurethanes (A) may be grafted with olefinically unsaturated monomers (a9). Examples of suitable monomers (a9) are the following:

Monomers (a91):

Hydroxyalkyl esters of acrylic acid, methacrylic acid or another alpha,beta-ethylenically unsaturated carboxylic acid, which derive from an alkylene glycol which is esterified with the acid, or are obtainable by reacting the acid with an alkylene oxide, especially hydroxyalkyl esters of acrylic acid, methacrylic acid or ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate or crotonate; 1,4-bis(hydroxymethyl)cyclohexane, octahydro-4,7-methano-1H-indenedimethanol or methylpropanediol monoacrylate, monomethacrylate, monoethacrylate or monocrotonate; or reaction products of cyclic esters, such as ε-caprolactone, for example, and these hydroxyalkyl esters; or olefinically unsaturated alcohols such as allyl alcohol or ethers of polyols such as trimethylolpropane diallyl ether or pentaerythritol diallyl or triallyl ether. These monomers (a91) of higher functionality are generally used only in minor amounts. In the context of the present invention, minor amounts of higher-functional monomers here are those amounts which do not lead to crosslinking or gelling of the polyacrylate resins. For example, the fraction of trimethylolpropane diallyl ether may be from 2 to 10% by weight, based on the overall weight of the monomers (a91) to (a96) used to prepare the polyacrylate resin.

Monomers (a92):

(Meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol or tert-butylcyclohexyl (meth)acrylate; (meth)acrylic oxaalkyl esters or oxacycloalkyl esters such as ethyltriglycol (meth)acrylate and methoxyoligoglycol (meth)acrylate having a molecular weight Mn of preferably 550; or other ethoxylated and/or propoxylated, hydroxyl-free (meth)acrylic acid derivatives. These may include, in minor amounts, higher-functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4-diol di(meth)acrylate; trimethylolpropane di- or tri(meth)acrylate; or pentaerythritol di-, tri- or tetra(meth)acrylate. In the context of the present invention, minor amounts of higher-functional monomers (a92) here are those which do not lead to crosslinking or gelling of the polyacrylate resins.

Monomers (a93):

Ethylenically unsaturated monomers which carry at least one acid group, preferably a carboxyl group, per molecule, or a mixture of such monomers. Monomers (a93) used for particular preference are acrylic acid and/or methacrylic acid. However, it is also possible to use other ethylenically unsaturated carboxylic acids having up to 6 carbon atoms in the molecule. Examples of such acids are ethacrylic acid, crotonic acid, maleic acid, fumaric acid, and itaconic acid. It is also possible to use ethylenically unsaturated sulfonic or phosphonic acids, and/or their partial esters, as component (a93). Further suitable monomers (a93) include mono(meth) acryloyloxyethyl maleate, succinate, and phthalate.

Monomers (a94):

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid and/or with carbon monoxide and water produces a mixture of carboxylic acids in which the carboxyl groups are located predominantly on a quaternary carbon atom. Examples of other olefinic starting materials are propylene trimer, propylene tetramer, and diisobutylene. Alternatively, the vinyl esters may be prepared conventionally from the acids, for example, by reacting the acid with acetylene. Particular preference is given—owing to their ready availability—to vinyl esters of saturated aliphatic monocarboxylic acids having 9 to 11 carbon atoms that are branched on the alpha carbon atom.

Monomers (a95):

Reaction products of acrylic acid and/or methacrylic acid with the glycidyl ester of an alpha-branched monocarboxylic acid having 5 to 18 carbon atoms per molecule. The reaction of the acrylic or methacrylic acid with the glycidyl ester of a carboxylic acid having a tertiary alpha carbon atom may take place before, during or after the polymerization reaction. As component (a95) it is preferred to use the reaction product of acrylic and/or methacrylic acid with the glycidyl ester of Versatic® acid. This glycidyl ester is available commercially under the name Cardura® E10. For further details, refer to Römpp Lexikon Lacke und Druckfarben, Georg Thieme Verlag, Stuttgart, New York*/, 1998, pages 605 and 606.

Monomers (a96):

Ethylenically unsaturated monomers which are essentially free from acid groups, such as olefins such as ethylene, propylene, 1-butene, 1-pentene, 1-hexene, cyclohexene, cyclopentene, norbornene, butadiene, isoprene, cyclopentadiene and/or dicyclopentadiene;

(meth)acrylamides such as (meth)acrylamide, N-methyl-, N,N-dimethyl-, N-ethyl, N,N-diethyl, N-propyl, N,N-dipropyl, N-butyl, N,N-dibutyl, N-cyclohexyl- and/or N,N-cyclohexyl methyl-(meth)acrylamide;

monomers containing epoxide groups such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methylstyrene and/or vinyltoluene;

diarylethylenes, especially those of the general formula II:

$$R^9R^{10}C=CR^{11}R^{12} \qquad (II),$$

in which the radicals $R^9$, $R^{10}$, $R^{11}$ and $R^{12}$ in each case independently of one another are hydrogen atoms or substituted or unsubstituted alkyl, cycloalkyl, alkylcycloalkyl, cycloalkyalkyl, aryl, alkylaryl, cycloalkylaryl, arylalkyl or arylcycloalkyl radicals, with the proviso that at least two of the variables $R^9$, $R^{10}$, $R^{11}$ and $R^{12}$ are substituted or unsubstituted aryl, arylalkyl or arylcycloalkyl radicals, especially substituted or unsubstituted aryl radicals. Examples of suitable alkyl radicals are methyl, ethyl, propyl, isopropyl, n-butyl, isobutyl, tert-butyl, amyl, hexyl or 2-ethylhexyl. Examples of suitable cycloalkyl radicals are cyclobutyl, cyclopentyl or cyclohexyl. Examples of suitable alkylcycloalkyl radicals are methylenecyclohexane, ethylenecyclohexane or propane-1,3-diylcyclohexane. Examples of suitable cycloalkylalkyl radicals are 2-, 3- or 4-methyl-, -ethyl-, -propyl- or -butylcyclohex-1-yl. Examples of suitable aryl radicals are phenyl, naphthyl or biphenylyl, preferably phenyl and naphthyl, and especially phenyl. Examples of suitable alkylaryl radicals are benzyl or ethylene- or propane-1,3-diyl-benzene. Examples of suitable cycloalkylaryl radicals are 2-, 3- or 4-phenylcyclohex-1-yl. Examples of suitable arylalkyl radicals are 2-, 3- or 4-methyl-, -ethyl-, -propyl- or -butylphen-1-yl. Examples of suitable arylcycloalkyl radicals are 2-, 3- or 4-cyclohexylphen-1-yl. The aryl radicals $R^9$, $R^{10}$, $R^{11}$ and/or $R^{12}$ are preferably phenyl or naphthyl radicals, especially phenyl radicals. The substituents that may be present in the radicals $R^9$, $R^{10}$, $R^{11}$ and/or $R^{12}$ are electron-withdrawing or electron-donating atoms or organic radicals, especially halogen atoms, nitrile, nitro, partially or fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy and cycloalkyloxy radicals; arylthio, alkylthio and cycloalkylthio radicals, and/or primary, secondary and/or tertiary amino groups. Particularly advantageous are diphenylethylene, dinaphthaleneethylene, cis- or trans-stilbene, vinylidenebis(4-N,N-dimethylaminobenzene), vinylidenebis(4-aminobenzene) or vinylidenebis(4-nitrobenzene), especially diphenylethylene (DPE), and so are used with preference. Preferably, these monomers (a96) are not used as the sole monomers, but instead are always used together with other monomers (a), in which case they advantageously regulate the copolymerization such that a free-radical copolymerization in batch mode is also possible;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate, vinyl esters of Versatic® acids, which are marketed under the brand name VeoVa® by the company Deutsche Shell Chemie (for further details, refer to Römpp Lexikon Lacke und Druckfarben, Georg Thieme Verlag, Stuttgart, New York, 1998, page 598 and also pages 605 and 606), and/or the vinyl ester of 2-methyl-2-ethylheptanoic acid; and/or polysiloxane macromonomers having a number-average molecular weight Mn of from 1000 to 40,000, preferably from 2000 to 20,000, with particular preference from 2500 to 10,000, and in particular from 3000 to 7000 and having on average from 0.5 to 2.5, preferably from 0.5 to 1.5, ethylenically unsaturated double bonds per molecule, as described in DE 38 07 571 A1 on pages 5 to 7, in DE 37 06 095 A1 in columns 3 to 7, in EP 0 358 153 B1 on pages 3 to 6, in U.S. Pat. No. 4,754,014 A in columns 5 to 9, in DE 44 21 823 A1 or in the international patent application WO 92/22615 on page 12 line 18 to page 18 line 10, or acryloxysilane-containing vinyl monomers, preparable by reacting hydroxy-functional silanes with epichlorohydrin and subsequently reacting that reaction product with (meth)acrylic acid and/or hydroxyalkyl esters of (meth)acrylic acid.

From these suitable monomers (a9) described by way of example above, the skilled worker is readily able to select those which are particularly suitable for the respective end use, on the basis of their known physicochemical properties and reactivities. If appropriate, he or she may carry out a few preliminary rangefinding experiments for this purpose. In particular, he or she will ensure that the monomers (a9) do not contain any functional groups, especially (potentially) cationic or anionic functional groups, which enter into unwanted interactions with the (potentially) anionic or cationic functional groups in the polyurethanes (A).

In accordance with the invention, the monomers (a9) are selected such that the profile of properties of the grafted-on (co)polymers is determined essentially by the above-described (meth)acrylate monomers (a9), the other monomers (a9) broadly varying this profile of properties in an advantageous manner.

In accordance with the invention, very particular advantages result if mixtures of the monomers (a91), (a92) and (a93) and also, if desired, (a96) are used.

Viewed in terms of its method, the preparation of the polyurethane (meth)acrylate graft copolymers (A) has no special features but instead takes place in accordance with the customary and known methods of free-radical (co)polymerization in bulk, solution or emulsion in the presence of at least one polymerization initiator.

Where the (co)polymerization takes place in bulk or solution, the polyurethane (meth)acrylate graft copolymer (A) is dispersed in an aqueous medium, so giving a secondary dispersion.

Preferably, the (co)polymerization is conducted in emulsion, as described, for example, in patent DE 197 22 862 C1 or patent applications DE 196 45 761 A1, EP-A 522 419 A1 or EP 0 522 420 A1, or in miniemulsion or microemulsion. For further details of miniemulsion and microemulsion, refer to patent applications and literature references DE 196 28 142 A1, DE 196 28 143 A1 or EP 0 401 565 A1, Emulsion Polymerization and Emulsion Polymers, editors P. A. Lovell and Mohamed S. El-Aasser, John Wiley and Sons, Chichester, N.Y., Weinheim, 1997, pages 700 et seq; Mohamed S. El-Aasser, Advances in Emulsion Polymerization and Latex Technology, 30th Annual Short Course, Volume 3, Jun. 7-11, 1999, Emulsion Polymers Institute, Lehigh University, Bethlehem, Pa., U.S.A. In the case of (co)polymerization in emulsion, miniemulsion or microemulsion, the graft copolymers of the invention are obtained in the form of primary dispersions.

Suitable reactors for the (co)polymerization processes are the customary and known stirred vessels, cascades of stirred vessels, tube reactors, loop reactors or Taylor reactors, as described, for example, in patents DE 1 071 241 A1, EP 0 498

583 A1, and DE 198 28 742 A1, and in the article by K. Kataoka in Chemical Engineering Science, Volume 50, No. 9, 1995, pages 1409 to 1416.

The (co)polymerization is advantageously conducted at temperatures above room temperature and below the lowest decomposition temperature of the particular monomers used, the chosen temperature range being preferably from 30 to 180° C., with very particular preference from 70 to 150° C., and in particular from 80 to 110° C.

When using particularly volatile monomers (a9) and/or emulsions, the (co)polymerization may also be conducted under pressure, preferably under from 1.5 to 3000 bar, with particular preference from 5 to 1500 bar, and in particular from 10 to 1000 bar.

Examples of suitable polymerization initiators are initiators which form free radicals, such as dialkyl peroxides, for instance, di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; potassium, sodium or ammonium peroxodisulfate; azo dinitriles such as azobis-isobutyronitrile; C—C-cleaving initiators such as benzpinacol silyl ethers; or a combination of a nonoxidizing initiator with hydrogen peroxide. It is preferred to use water-insoluble initiators. The initiators are used preferably in an amount of from 0.1 to 25% by weight, with particular preference from 2 to 10% by weight, based on the overall weight of the monomers (a9).

In the polyurethane (meth)acrylate graft copolymers (A), the proportion of polyurethane (A) to grafted-on monomers (a9) may vary widely, which is a particular advantage of the polyurethane (meth)acrylate graft copolymers (A). Preferably, this ratio is from 1:100 to 100:1, more preferably from 1:50 to 50:1, with particular preference from 30:1 to 1:30, with very particular preference from 20:1 to 1:20, and in particular from 10:1 to 1:10. Very particular advantages result if this ratio is approximately 3.5:1 to 1:3.5, in particular from 1.5:1 to 1:1.5.

The amount of the polyurethanes (A) and/or of the polyurethane (meth)acrylate graft copolymers (A) to be used in accordance with the invention as a proportion of the coating materials of the invention may vary widely and is guided primarily by the intended use of the coating materials, by the curing mechanism and by the functionality of the binders (A) with respect to the crosslinking reaction with the crosslinking agents that may be present. In accordance with the invention it is of advantage to use the binders (A) in an amount of from 5 to 70, preferably from 6 to 65, with particular preference from 7 to 60, and in particular from 8 to 55% by weight, based in each case on the solids of the coating material of the invention.

Preferably, the binders (A) are employed in the form of their aqueous dispersions for the preparation of the coating material of the invention.

The further essential constituent of the coating material of the invention is at least one color and/or effect pigment (B).

The pigments (B) may comprise both organic and inorganic compounds. The coating material of the invention, especially the aqueous basecoat and solid-color topcoat of the invention, specifically the aqueous basecoat of the invention, therefore ensures, on the basis of this large number of suitable pigments (B), a universal scope of use, and permits the realization of a large number of color shades and optical and other physical effects.

The effect pigments (B) are preferably selected from the group consisting of organic and inorganic, colored and achromatic, optical-effect, electrically conductive, magnetically shielding, and fluorescent pigments.

Examples of suitable optical-effect pigments (B) are metal flake pigments, such as standard commercial aluminum bronzes, aluminum bronzes chromated in accordance with DE 36 36 183 A1, standard commercial stainless steel bronzes, and nonmetallic effect pigments, such as pearlescent pigments and dichroic interference pigments, platelet-shaped effect pigments based on iron oxide with a color from pink to brownish red, or liquid-crystalline effect pigments. For further details, refer to Römpp Lexikon Lacke und Druckfarben, Georg Thieme Verlag, 1998, page 176, "Effect pigments" and pages 380 and 381 "Metal oxide-mica pigments" to "Metal pigments", and to patents and patent applications DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. Nos. 4,828,826 A and 5,244,649 A and also European patents EP 0 736 076 B1, EP 0 736 077 B1 and EP 0 736 073 B1. It is also possible to use combinations of different effect pigments.

Examples of fluorescent pigments (B) (daylight-fluorescent pigments) are bis(azomethine) pigments.

Examples of suitable electrically conductive pigments (B) are titanium dioxide/tin oxide pigments.

Examples of magnetically shielding pigments (B) are pigments based on iron oxides or chromium dioxide.

Color pigments (B) which can be used include organic and inorganic pigments.

Examples of suitable inorganic color pigments are white pigments, such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, refer to Römpp Lexikon Lacke und Druckfarben, Georg Thieme Verlag, 1998, pages 180 and 181, "Iron blue pigments" to "Black iron oxide", pages 451 to 453, "Pigments" to "Pigment volume concentration", page 563, "Thioindigo pigments", page 567 "Titanium dioxide pigments", pages 400 and 467, "Naturally occurring pigments", page 459, "Polycyclic pigments", page 52, "Azomethine pigments", "Azo pigments" and page 379, "Metal complex pigments".

Furthermore, it is possible as well to use pigments (B) which are selected from the group of extending, rheology control, scratchproofing, transparent or hiding and corrosion-protective pigments, such as metal powders, organic and inorganic, transparent or hiding fillers or nanoparticles.

Examples of suitable metal powders (B) are powders of metals and metal alloys, such as aluminum, zinc, copper, bronze or brass.

An example of a corrosion-protective pigment (B) is zinc phosphate.

Examples of suitable organic and inorganic fillers (B) are chalk, calcium sulfates, barium sulfate, silicates such as talc, mica or kaolin, silicas, oxides such as aluminum hydroxide or magnesium hydroxide, or organic fillers such as polymer powders, especially of polyamide or polyacrylonitrile. For further details refer to Römpp Lexikon Lacke und Druckfarben, Georg Thieme Verlag, 1998, pages 250 ff. "Fillers".

It is preferred to employ mica and talc if the intention is to improve the scratch resistance of the color and/or effect coats produced from the basecoat materials.

It is further advantageous to use mixtures of platelet-shaped inorganic fillers (B), such as talc or mica, and non-platelet-shaped inorganic fillers, such as chalk, dolomite, calcium sulfate or barium sulfate, since this allows the viscosity and rheology to be adjusted very effectively.

Examples of suitable transparent fillers (B) are those based on silica, alumina or zirconium oxide.

Suitable nanoparticles (B) are selected from the group consisting of hydrophilic and hydrophobic, especially hydrophilic, nanoparticles based on silica, alumina, zinc oxide, zirconium oxide and the polyacids and heteropolyacids of transition metals, preferably of molybdenum and tungsten, having a primary particle size <50 nm, preferably 5 to 50 nm, in particular 10 to 30 nm. The hydrophilic nanoparticles preferably have no flatting effect. Particular preference is given to using nanoparticles based on silica.

Very particular preference is given to using hydrophilic pyrogenic silicas whose agglomerates and aggregates have a chainlike structure and which can be prepared by the flame hydrolysis of silicon tetrachloride in an oxyhydrogen flame. These are sold, for example, by Degussa under the brand name Aerosil®. Very particular preference is also given to using precipitated waterglasses, such as nanohectorites, which are sold, for example, by Südchemie under the brand name Optigel® or by Laporte under the brand name Laponite®. Further examples of nanoparticles (B) are known from German patent applications DE 195 40 623 A1, column 4 line 31 to column 5 line 30,
DE 197 19 948 A1, page 2 lines 42 to 67,
DE 197 46 885 A1, page 2 lines 42 to 68, or
WO 00/22052, page 5 line 9 to page 6 line 2.

The surface of the nanoparticles may have been modified. For this purpose it is possible to use organic silicon compounds.

The pigment concentration of the coating material of the invention may vary very widely and is guided primarily by the effect that is to be brought about and/or by the opacity of the color pigments. The pigment concentration is preferably, in total, 3 to 90% by weight, based on the solids of the coating material of the invention.

As a further inventively essential constituent, the coating material of the invention comprises at least one, especially one, dispersing assistant for the color and/or effect pigments (B), selected from the group consisting of the reaction products of (c1) at least one, especially one, functionalized copolymer containing
  (c11) at least one, especially one, copolymerized olefinically unsaturated monomer selected from the group consisting of olefinically unsaturated monomers containing at least one reactive functional group selected from the group consisting of isocyanate groups, anhydride groups and epoxy groups; and
  (c12) at least one, especially one, copolymerized olefinically unsaturated monomer which is free from isocyanate-, anhydride- and epoxy-reactive functional groups;
(c2) at least one, especially one, homopolymeric polyalkylene glycol, and
(c3) at least one, especially one, compound of the general formula I:

$$NR_2—C(O)—NR_2 \qquad (I)$$

in which the variables R are selected from the group consisting of hydrogen atoms and saturated and unsaturated, substituted and unsubstituted, aliphatic, cycloaliphatic, aliphatic-cycloaliphatic, aromatic, aliphatic-aromatic and cycloaliphatic-aromatic radicals which may contain at least one amino group —NH—, at least one oxygen atom —O— and/or at least one sulfur atom —S— and/or may be cyclically linked to one another, at least one organic radical R being present and the radical R or at least one of the radicals R containing at least one reactive functional group selected from the group consisting of isocyanate-, anhydride- and epoxy-reactive groups.

Examples of suitable olefinically unsaturated monomers (c11) and the amounts in which they are preferably employed are known from European patent application EP 0 589 340 A1, page 3 lines 35 to 54.

Examples of suitable olefinically unsaturated monomers (c12) and the amounts in which they are preferably employed are known from European patent application EP 0 589 340 A1, page 3 line 54 to page 4 line 6.

In addition it is possible to use functional, aromatic, olefinically unsaturated monomers (c13), especially the above-described aromatic olefinically unsaturated monomers (a96) and/or the aromatic olefinically unsaturated monomers known from European patent application EP 0 589 340 A1, page 4 lines 7 to 15.

The copolymers (c1) are preferably prepared as described in European patent application EP 0 589 340 A1, page 5 line 31 to page 6 line 2, and have the properties described therein.

Examples of suitable homopolymeric polyalkylene glycols (c2) are the polyalkylene glycols described above in connection with the polyols (a2) and those described in European patent application EP 0 589 340 A1, page 4 lines 17 to 28.

Examples of suitable compounds of the general formula I and the amounts in which they are preferably employed are known from European patent application EP 0 589 340 A1, page 4 line 39 to page 5 line 16.

The dispersing assistants (C) are preferably prepared by the processes described in European patent application EP 0 589 340 A1, page 3 line 30 to page 6 line 31 and page 7 line 32 to page 9 line 2. They preferably have a number-average molecular weight of from 3000 to 25 000, in particular from 5000 to 12 000 daltons.

The amount of the dispersing assistant (C) in the coating material of the invention may vary very widely and is guided by the requirements of the case in hand, in particular by the dispersibility of the pigments (B). The dispersing assistants (C) are preferably employed in an amount of from 0.01 to 10%, more preferably from 0.02 to 5%, and in particular from 0.02 to 2% by weight, based in each case on the solids of the coating material of the invention. The dispersing assistants (C) are incorporated into the coating material of the invention with particular preference by way of the pigment formulations (cf. Römpp Online, Georg Thieme Verlag, Stuttgart, New York, 2002, "Pigment formulations") or pigment pastes.

The coating material of the invention comprises not least at least one rheological aid (D) based on (meth)acrylate copolymers. Examples of suitable rheological aids (D) are described in Römpp Lexikon Lacke und Druckfarben, Georg Thieme Verlag, Stuttgart, New York, 1998, "Thickeners", pages 599 to 600, and "Polyacrylic acids", page 457, in German patent applications DE 196 52 842 A1 and DE 197 41 554 A1, and in the textbook "Lackadditive" [Additives for coatings] by Johan Bieleman, Wiley-VCH, Weinheim, N.Y., 1998, pages 31 to 34. Preference is given to using salts of polyacrylic acid. The rheological aids (D) are commercial products and are sold, for example, under the brand name Viscalex® HV30 by Allied Colloids. In the coating material of the invention they are used in the customary and known amounts.

The coating material of the invention may further comprise at least one crosslinking agent.

Examples of suitable crosslinking agents are amino resins, as described, for example, in Römpp Lexikon Lacke und Druckfarben, Georg Thieme Verlag, 1998, page 29, "amino resins", in the textbook "Lackadditive" [Additives for coatings] by Johan Bieleman, Wiley-VCH, Weinheim, N.Y., 1998, pages 242 ff., in the book "Paints, Coatings and Solvents", second, completely revised edition, Eds. D Stoye and W. Freitag, Wiley-VCH, Weinheim, N.Y., 1998, pages 80 ff., in U.S. Pat. No. 4,710,542 A1 and EP 0 245 700 A1, and in the article by B. Singh and coworkers, "Carbamylmethylated Melamines, Novel Crosslinkers for the Coatings Industry", in Advanced Organic Coatings Science and Technology Series, 1991, volume 13, pages 193 to 207; carboxyl-containing compounds or resins, as described for example in patent DE 196 52 813 A1; compounds or resins containing epoxide groups, as described for example in patents EP 0 299 420 A1, DE 22 14 650 B1, DE 27 49 576 B1, U.S. Pat. Nos. 4,091,048 A1 and 3,781,379 A1; blocked and unblocked polyisocyanates, as described for example in U.S. Pat. No. 4,444,954 A1, DE 196 17 086 A1, DE 196 31 269 A1, EP 0 004 571 A1 and EP 0 582 051 A1, or described above as compounds (a1); and/or tris(alkoxycarbonylamino)triazines, as described in U.S. Pat. Nos. 4,939,213 A1, 5,084,541 A1, 5,288,865 A1 and EP 0 604 922 A1.

The amount of the crosslinking agents in the coating material of the invention may vary very widely and is guided in particular by their functionality on the one hand and by the functionality of the polyurethanes (A) on the other.

The coating material of the invention may further comprise at least one organic solvent (cosolvent). The cosolvent is preferably miscible with water. Examples of customary and known cosolvents are described in D. Stoye and W. Freitag (eds.), "Paints, Coatings and Solvents", 2nd, Completely Revised Edition, Wiley-VCH, Weinheim, N.Y., 1998, "14.9. Solvent Groups", pages 327 to 373. In the coating material of the invention they are used preferably in an amount of from 1 to 20%, in particular from 2 to 18%, by weight based on the coating material of the invention.

The coating material of the invention may further comprise at least one neutralizing agent. Examples of suitable neutralizing agents are those described above in connection with the polyurethanes (A).

It is preferred to set a degree of neutralization of from 50 to 150 mol %, based on the potentially ionic groups present in the polyurethane (A).

The coating material of the invention may comprise not least at least one typical coatings additive, selected from the group consisting of organic and inorganic additives.

Examples of suitable typical coatings additives are additional binders curable thermally and/or with actinic radiation, reactive diluents for the thermal curing or actinic radiation curing, UV absorbers, light stabilizers, free-radical scavengers, free-radical polymerization initiators, thermal crosslinking catalysts, photoinitiators and photocoinitiators, slip additives, polymerization inhibitors, defoamers, emulsifiers, wetting agents, dispersants, adhesion promoters, leveling agents, film-forming auxiliaries, additional rheology control additives (thickeners) with the exception of phyllosilicates, flame retardants, siccatives, dryers, antiskinning agents, corrosion inhibitors, waxes, and flatting agents, as known, for example, from the textbook "Lackadditive" by Johan Bieleman, Wiley-VCH, Weinheim, N.Y., 1998.

The amount of the above-described additives in the coating material of the invention may vary very widely and is guided in particular by the function of the particular additive used. They are used advantageously in the amounts indicated in the prior art cited above.

The above-described essential constituents (A) to (D) and also the other constituents of the coating material of the invention that are present where appropriate are in dispersion and/or solution in water. The solids content of the coating material of the invention may vary widely. It is guided in particular by the viscosity necessary for storage, transit, and application. This should on the one hand prevent the settling of the constituents on storage and in transit. On the other hand it should ensure trouble-free application with effective flow of the resulting paint films. It is preferred to employ a solids content of from 10 to 60%, more preferably 12 to 58%, with particular preference 14 to 56%, and in particular 16 to 54% by weight, based in each case on the coating material of the invention.

The coating material of the invention may be prepared by all customary and known processes for preparing aqueous basecoat materials. The dispersions may be sheared using a customary and known mixing apparatus such as a stirred vessel, a homogenizer, a dissolver, a stirred mill, a Supraton or an Ultraturrax. It is a particular advantage of the process of the invention that the pseudoplasticity is built up relatively rapidly even in a comparatively weak shear field as provided by a simple stirrer. There is therefore no need for expensive and maintenance-intensive apparatus necessary for generating strong shear fields. Surprisingly, skinning is avoided as well.

The coating material of the invention, especially the aqueous basecoat of the invention, is outstandingly suited to the production of multicoat color and/or effect paint systems on primed and unprimed substrates by the wet-on-wet method. Furthermore, the coating material of the invention, especially the solid-color topcoat material of the invention, is outstandingly suited to producing single-coat color and/or effect paint systems.

The coating material of the invention exhibits particular advantages in its use as an aqueous basecoat as part of the wet-on-wet method, in which the aqueous basecoat material is applied to the primed or unprimed substrate, after which the aqueous basecoat film is dried, but not cured, a clearcoat material is applied to the aqueous basecoat film, and the resulting clearcoat film is cured thermally, or thermally and with actinic radiation (dual cure), together with the aqueous basecoat film.

In the case of a primed substrate, the primer, especially the surfacer film, may be overcoated in the uncured or only part-cured state with the aqueous basecoat material of the invention and with the clearcoat material, after which all three films are baked together.

In another variant of the wet-on-wet method, a first aqueous basecoat film is applied to an uncured or only part-cured primer, especially an electrodeposition coating film, that is present on the substrate, and then the two films are thermally cured together. The resultant coating is then overcoated as described above with a second aqueous basecoat and clearcoat. In this case, the first or the second aqueous basecoat may be produced from an aqueous basecoat material of the invention. Alternatively, both aqueous basecoats may be produced from a single aqueous basecoat material of the invention, or from two materially different aqueous basecoat materials of the invention.

Suitable coating substrates are all surfaces which are not damaged by curing of the films present thereon with the use of heat or with the combined use of heat and actinic radiation (dual cure). Suitable substrates comprise, for example, metals, plastics, wood, ceramic, stone, textile, fiber composites, leather, glass, glass fibers, glass wool, rockwool, mineral- and resin-bound building materials, such as plasterboards, cement slabs or roof shingles, and assemblies of these materials.

The coating materials of the invention are therefore outstandingly suitable for producing decorative, functional and/or protective coatings on motor vehicle bodies and parts thereof, the interior and exterior of motor vehicles, interior and exterior architecture, doors, windows, furniture and hollow glassware and also in the context of the industrial coating of small parts, coils, containers, packaging, electrical components and white goods.

In the case of electrically conductive substrates it is possible to use primers prepared in customary and known manner from electrodeposition coating materials. Suitable for this purpose are both anodic and cathodic electrodeposition coating materials, but especially cathodic. Usually, especially in automotive finishing, a surfacer coating or antistonechip primer is applied subsequently, which is regarded as part of the primer. Electrodeposition coating materials and surfacers may also be applied wet-on-wet and subjected to joint thermal curing.

It is also possible to use primed or unprimed plastics parts, provided they are dimensionally stable under the thermal curing conditions employed. In the case of unfunctionalized and/or nonpolar substrate surfaces, these may be subjected conventionally to a pre-coating pretreatment, such as with a plasma or by flaming, or may be provided with a hydroprimer.

The coating materials of the invention may be applied by any of the customary methods, such as spraying, knife coating, brushing, flow coating, dipping, impregnating, trickling or rolling, for example. The substrate to be coated may itself be at rest, with the application equipment or unit being moved. Alternatively, the substrate to be coated, especially a coil, may be moved, with the application unit being at rest relative to the substrate or being moved appropriately. Where the coating materials of the invention include constituents which can be activated with actinic radiation, application is conducted preferably in the absence of actinic radiation.

In general, the electrodeposition coating film, surfacer film, solid-color topcoat film of the invention, aqueous basecoat film of the invention and clearcoat film are applied in a wet-film thickness such that their curing results in coatings having the coat thicknesses advantageous and necessary for their functions.

In the case of the electrodeposition coat, this coat thickness is from 10 to 100, preferably from 10 to 80, with particular preference from 10 to 60, and in particular from 10 to 40 µm.

In the case of the surfacer coat, it is from 10 to 150, preferably from 10 to 120, with particular preference from 10 to 100, and in particular from 10 to 90 µm.

In the case of the solid-color topcoats of the invention, it is from 10 to 100, preferably from 10 to 80, with particular preference from 10 to 60, and in particular from 10 to 40 µm.

In the case of the aqueous basecoat of the invention, it is from 5 to 50, preferably from 5 to 40, with particular preference from 5 to 30, and in particular from 10 to 25 µm.

In the case of the clearcoats, it is from 10 to 100, preferably from 15 to 80, with particular preference from 20 to 70, and in particular from 25 to 60 µm.

Alternatively, it is possible to employ the multicoat system known from European patent application EP 0 817 614 A1, comprising an electrodeposition coat, a first basecoat, a second basecoat, and a clearcoat, in which the total coat thickness of the first and second basecoats is from 15 to 40 µm and the coat thickness of the first basecoat is from 20 to 50% of said overall coat thickness.

The coating films of the invention are preferably cured thermally, or thermally and with actinic radiation (dual cure).

Curing may take place after a certain resting time. This may have a duration of from 30 s to 2 h, preferably from 1 min to 1 h, and in particular from 1 min to 45 min. The resting time is used, for example, for the leveling and degassing of the coating films or for the evaporation of volatile constituents such as solvent. The resting time may be assisted and/or shortened by the application of elevated temperatures of up to 90° C. and/or by a reduced atmospheric humidity <10 g water/kg air, especially <5 g/kg air, provided that this does not entail any damage or change to the coating films, such as premature complete crosslinking, for instance.

In the case of two-component or multicomponent systems of the invention, curing actually begins under the conditions indicated above.

The thermal curing has no special features as to its method but instead takes place in accordance with the customary and known methods, such as heating in a convection oven or irradiation with IR lamps. The thermal curing may also take place in stages.

Preferably, the thermal crosslinking of the one-component systems of the invention is conducted at temperatures above 100° C. In general it is advisable not to exceed temperatures of 180° C. here, preferably 160° C. and in particular 155° C.

Preferably, curing with actinic radiation is carried out with UV radiation and/or electron beams. Preference is given in this case to employing a dose of from 1000 to 3000, preferably from 1100 to 2900, with particular preference from 1200 to 2800, with very particular preference from 1300 to 2700, and in particular from 1400 to 2600 mJ/cm$^2$. If desired, this curing may be supplemented by actinic radiation from other radiation sources. In the case of electron beams, it is preferred to operate under an inert gas atmosphere. This can be ensured, for example, by supplying carbon dioxide and/or nitrogen directly to the surface of the coating films. In the case of UV radiation curing, as well, it is possible to operate under inert gas or an oxygen-depleted atmosphere in order to prevent the formation of ozone.

Curing with actinic radiation is carried out using the customary and known radiation sources and optical auxiliary measures. Examples of suitable radiation sources are flashlamps from the company VISIT, high- or low-pressure mercury vapor lamps, with or without lead doping in order to open up a radiation window of up to 405 nm, or electron beam sources. Their arrangement is known in principle and may be adapted to the circumstances of the workpiece and of the process parameters. In the case of workpieces of complex shape, as envisaged for automobile bodies, the regions not accessible to direct radiation (shadow regions) such as cavities, folds and other structural undercuts, may be (partially)

cured using pointwise, small-area or all-round emitters in conjunction with an automatic movement apparatus for the irradiation of cavities or edges.

The equipment and conditions of these curing methods are described, for example, in R. Holmes, U.V. and E.B. Curing Formulations for Printing Inks, Coatings and Paints, SITA Technology, Academic Press, London, United Kingdom 1984.

This curing may be carried out in stages, i.e., by multiple exposure or irradiation with actinic radiation. It may also take place in alternation, i.e., by curing alternately with UV radiation and electron beams.

If thermal curing and actinic radiation curing are employed together, these methods may be used simultaneously or alternately. If the two curing methods are used alternately, it is possible, for example, to commence with thermal curing and to end with actinic radiation curing. In other cases it may prove advantageous to commence with actinic radiation curing and to end with it. Particular advantages result if the coating films are cured in two separate steps, first with actinic radiation and then thermally.

In the context of the coating processes of the invention, the above-described application and curing methods may also be employed for the production of the surfacer coats and clearcoats.

In the case of repair to multicoat color and/or effect paint finishes it is possible to apply the coating materials of the invention without special pretreatment and/or auxiliary means to the surfaces that are to be repaired.

The single-coat and multicoat paint systems of the invention have outstanding optical, mechanical, and chemical properties. They are free from wetting defects, runs, popping marks, pinholes, clouds, effect defects, water spots, and shifts in shade. They also meet all the requirements imposed in terms of wet adhesion and stonechip resistance following exposure to constant condensation conditions and following exposure to boiling water and subsequent jetting with a high pressure steam jet. In particular, with the multicoat finishes of the invention, no film delamination in the course of high-pressure cleaning with hot steam is observed, owing to their outstanding wet adhesion properties.

Furthermore, the coatings of the invention offer further advantages. Thus they are an effective physical barrier to the diffusion of plasticizers, adhesives, antioxidants or solvents, and are of high heat resistance. They have good antistatic properties and offer significantly improved corrosion protection and significantly improved wetting properties.

Consequently, the substrates of the invention, especially bodies of automobiles and commercial vehicles, interior and exterior architecture, industrial components, including plastics parts, small parts, packaging, coils, white goods, and electrical components, or furniture, doors, windows, and hollow glassware, which are coated with at least one coating of the invention exhibit particular technical and economic advantages, in particular a long service life, so making them particularly attractive to the users.

EXAMPLES

Preparation Example 1

The Preparation of a Binder Dispersion (A)

The polyurethane (meth)acrylate graft copolymer (A) was prepared in accordance with the instructions given in German patent application DE 44 37 535 A1 on page 7 lines 36 to 53, "C Preparation of an acrylated polyurethane dispersion".

For this purpose, a polyester diol was prepared first of all from 29.41 parts by weight of neopentyl glycol, 16.7 parts by weight of 1,6-hexanediol and 44.2 parts by weight of adipic acid in 8.8 parts by weight of methyl isobutyl ketone and also 0.86 part by weight of cyclohexane as entrainer.

In analogy to the instructions indicated above, a polyurethane was prepared from 1.87 parts by weight of neopentyl glycol, 17.4 parts by weight of the polyester diol solution, 0.6 part by weight of trimethylolpropane monoallyl ether and 12.82 parts by weight of isophorone diisocyanate in the presence of 0.010 part by weight of dibutyltin dilaurate and also 20.527 parts by weight of methyl isobutyl ketone, and was chain-extended with 3.056 parts by weight of trimethylolpropane.

The resultant polyurethane solution was used as the initial charge for the copolymerization of a monomer mixture of 14.041 parts by weight of n-butyl acrylate, 14.04 parts by weight of methyl methacrylate, 3.36 parts by weight of hydroxypropyl methacrylate and 2.62 parts by weight of acrylic acid. The initiator solution used was a mixture of 6.72 parts by weight of methyl isobutyl ketone and 1.02 parts by weight of tert-butyl peroxy-2-ethylhexanoate.

Dimethylethanolamine in 47.05 parts by weight of water was added to 51.84 parts by weight of the resultant acrylated polyurethane solution, after which the methyl isobutyl ketone was removed by distillation. The resultant acrylated polyurethane dispersion had a solids content of 44% by weight.

Preparation Example 2

The Preparation of a Dispersing Assistant (C)

The dispersing assistant (C) was prepared in accordance with the instructions specified in European patent application EP 0 589 340 A1, page 7 lines 33 to 45, "Example 1, Preparation of Isocyanate Functional Acrylic Copolymer 1" and page 8 lines 28 to 42, "Example 5, Preparation of Modified Copolymer (Grind Resin) 1".

Preparation Example 3

Preparation of a Pigment Paste

A pigment paste was prepared by mixing 7.5 parts by weight of dispersing assistant (C) from preparation example 2, 6 parts by weight of the binder dispersion (A) from preparation example 1, 35 parts by weight of a standard commercial green pigment, 0.3 part by weight of ligroin, 1.3 parts by weight of methyl isoamyl ketone, 0.1 part by weight of dimethylethanolamine, 3.5 parts by weight of Pluriol® P 900 (poly(oxypropylene) glycol from BASF Aktiengesellschaft), 44 parts by weight of deionized water and 6 parts by weight of 1-propoxy-2-propanol, and milling the resulting mixture.

Example 1

The Preparation of an Aqueous Basecoat Material of the Invention

The aqueous basecoat material of the invention was prepared by mixing 4.56 parts by weight of Cymel® 327 (90% in isobutanol), 2.88 parts by weight of Cymel® 303 (both melamine-formaldehyde resins from Cytec Specialty Resins A.S.), 1.46 parts by weight of Pluriol® P 900 (poly(oxypropylene) glycol from BASF Aktiengesellschaft), 2.47 parts by weight of butyl glycol, 2.23 parts by weight of butyl diglycol, 3.35 parts by weight of Shellsol® T, 1.75 parts by weight of Solventnaphtha®, 1.32 parts by weight of N-methylpyrrolidone, 0.66 part by weight of wetting agent solution (tetramethyldecynediol, 52% by weight in butyl glycol), 0.8 part by weight of leveling additive solution, Agitan® 281 (standard commercial additive, 100%), 0.92 part by weight of a standard commercial blocked sulfonic acid (Nacure® 2500 from King Industries, 25% in isopropanol), 9.67 parts by weight of Aerosil paste (6% by weight of Aerosil R 972/431 in water, from Degussa), 9.6 parts by weight of the binder dispersion (A) of preparation example 1, 31 parts by weight of the pigment paste of preparation example 3, 18 parts by weight of Viscalex® HV30 from Allied Colloids, and 2.5 parts by weight of a neutralizing agent solution (dimethylethanolamine, 10% in water) in a stirred vessel with one another.

The green aqueous basecoat material of the invention was completely stable on storage at room temperature at 40° C. At these temperatures it could be sheared without problems without any settling of constituents or phase separation. The required pseudoplasticity was built up by simple stirring. No skinning was observed.

Example 2

The Production of a Color Multicoat Paint System of the Invention

To produce the color multicoat paint system of example 2 the aqueous basecoat material of example 1 was used.

To test the shift in shade the aqueous basecoat material was processed, in a first series, immediately following its preparation. The multicoat paint system in question formed the standard against which the other multicoat paint systems of the second and third series were compared. In the case of the second series the aqueous basecoat materials were stored at 40° C. for seven days (temperature exposure). In the case of the third series they were stirred at low shear forces for two weeks (shearing load).

The color shades of the multicoat paint systems were measured by the CIELAB method, using an X-Rite colorimeter. Standardized illuminants were used. The differences from the standard were then calculated. The results can be found in the table.

Additionally, in order to test the wetting properties, the aqueous basecoat materials were applied in wedge form to glass plates and test panels with baked surfacer coatings.

To test the adhesion properties and mechanical stability of the aqueous basecoats, test panels measuring 10×20 cm were produced conventionally. This was done by coating steel panels (bodywork panels) coated with a conventional cathodically deposited and baked electrocoat (EC) with a standard commercial low-build surfacer (Ecoprime® 60 from BASF Coatings AG), after which the resulting surfacer film was flashed off at 20° C. and a relative humidity of 65% for five minutes and dried in a forced air oven at 80° C. for five minutes. The surfacer coat thereafter had a dry film thickness of 15 μm.

After the test panels had been cooled to 20° C. the unexposed aqueous basecoat material was applied, flashed off at 20° C. and a relative humidity of 65% for five minutes and dried in a forced air oven at 80° C. for five minutes, so that the dried aqueous basecoat films had a dry film thickness of approximately 15 μm.

After the test panels had again been cooled to 20° C. the aqueous basecoat films were overcoated with a powder slurry clearcoat material as per international patent application WO 96/32452. The resultant powder slurry clearcoat films were flashed off at 20° C. and a relative humidity of 65% for 3 minutes and dried in a forced air oven at 55° C. for 5 minutes. The dry film thickness of the resultant clearcoats was 55 to 57 μm.

Following the application of all three coats they were baked together at 135° C. for 30 minutes to give the multicoat paint system of the invention.

The test panels in question are referred to below as "original panels". Prior to testing and the application of the refinishes, they were stored in a controlled-climate chamber at 23° C. and a relative humidity of 50% for 24 hours.

To test the clearcoat wetting, test panels were produced in the manner described above, with the clearcoat material being applied in wedge form.

Some of the original panels were provided with a refinish in accordance with ISO 1520. These panels are referred to below as "refinish panels".

The original panels and the refinish panels were subjected to the cross-cut test of DIN ISO 2409: 1994-10.

Additionally, the original panels and the refinish panels were subjected, following exposure under constant condensation conditions (CCC), to the NedCar stonechip test VCKN4441. This stonechip test, its evaluation, and the rating of the results are common knowledge in the art.

Not least, the adhesion properties of the color multicoat paint systems on the original panels and refinish panels were tested after the panels had been exposed to boiling water by means of the high pressure test. Following exposure, a cross was inscribed in each of the multicoat paint systems. The scribed areas were sprayed with a water jet (Walter instrument type LTA2; pressure: 80 bar; water temperature: 80° C.; nozzle tip/test panel distance: 12 cm; exposure period: 30 seconds; apparatus setting: F2). The degree of spalling was assessed visually and rated as follows:

| Rating | Degree of spalling |
|---|---|
| 0 | none |
| 1 | slight |
| 2 | slight to moderate |
| 3 | moderate |
| 4 | severe |
| 5 | complete |

The results of these tests can be found in the table. They underscore the fact that the aqueous basecoat material of the invention from example 1 and the multicoat paint systems of the invention from example 2 (original panels and refinish panels) exhibited outstanding clearcoat wetting, wetting of glass, wetting of surfacer coats, adhesive strength, mechanical stability, and shade stability.

TABLE

Performance properties of the multicoat paint system of the invention

| Test method and treatment | Example 2 |
|---|---|
| Wetting properties: | |
| Clearcoat wetting: | from 4-5 μm |
| Wetting of glass: | very good |
| Wetting of surfacer coat: | very good |
| Cross-cut on: | |
| Original panels | GT0 |
| Refinish panels | GT0 |

TABLE-continued

Performance properties of the multicoat paint system of the invention

| Test method and treatment | Example 2 |
|---|---|
| NedCar VCKN 4441 stonechip test: | |
| Before exposure to CCC | |
| Original panels: | 10 |
| Refinish panels: | 8A |
| After exposure to CCC: | |
| Original panels: | 8A |
| Refinish panels | 7A |
| High pressure test: | |
| Original panels: | 0 |
| Refinish panels: | 0 |
| Shade stability: | |
| After 40° C. storage | |
| Delta in E/D 65 light | 1.98 |
| Delta in E/A light | 1.97 |
| Delta in E/B light | 2 |
| After stirring test: | |
| Delta in E/D 65 light | 0.75 |
| Delta in E/A light | 0.75 |
| Delta in E/B light | 0.76 |

What is claimed is:

1. An aqueous color, effect, or color and effect coating material which is free from rheological aids based on phyllosilicates, comprising:

(A) at least one polyurethane which is water-soluble, water-dilutable; water-dispersible, of a combination thereof, selected from the group consisting of ionically stabilized polyurethanes based on polyisocyanates; ionically and nonionically stabilized polyurethanes based on polyisocyanates; ionically stabilized polyurethanes based on polyisocyanates and grafted with olefinically unsaturated compounds; and ionically and nonionically stabilized polyurethanes based on polyisocyanates and grafted with olefinically unsaturated compounds;

wherein the polyisocyanates are selected from the group consisting of aliphatic polyisocyanates, cycloaliphatic polyisocyanates, aliphatic-cycloaliphatic polyisocyanates, aromatic polyisocyanates, aliphatic-aromatic polyisocyanates, cycloaliphatic-aromatic polyisocyanates, and a combination thereof;

(B) at least one color pigment, effect pigment, or color and effect pigment;

(C) at least one dispersing assistant for the color pigment, effect pigment, or color and effect pigments, comprising the reaction products of:

(c1) at least one functionalized copolymer comprising:

(c11) at least one copolymerized olefinically unsaturated monomer comprising at least one reactive functional group selected from the group consisting of isocyanate groups, anhydride groups and epoxy groups; and (c12) at least one copolymerized olefinically unsaturated monomer which is free from isocyanate-, anhydride- and epoxy-reactive functional groups;

(c2) at least one homopolymeric polyalkylene glycol, and (c3) at least one compound of the general formula I:

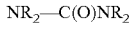

$$NR_2\text{—}C(O)NR_2 \qquad (I)$$

in which the variables R are selected from the group consisting of hydrogen atoms and organic, saturated and unsaturated, substituted and unsubstituted, aliphatic, cycloaliphatic, aliphatic-cycloaliphatic, aromatic, aliphatic-aromatic and cycloaliphatic-aromatic radicals which may contain at least one amino group —NH—, at least one oxygen atom —O— and/or at least one sulfur atom —S—and/or may be cyclically linked to one another, at least one organic radical R being present and the radical R or at least one of the radicals R containing at least one reactive functional group selected from the group consisting of isocyanate-, anhydride- and epoxy-reactive groups; and (D) at least one rheological aid based on (meth)acrylate copolymers.

2. The coating material of claim 1, curable thermally or thermally and with actinic radiation.

3. The coating material of claim 1, which is selected from the group consisting of a one-component system, a two-component system, and a multicomponent system.

4. The coating material of claim 1, wherein the at least one effect pigment (B) is selected from the group consisting of organic and inorganic, colored and achromatic, optical-effect, electrically conductive, magnetically shielding, and fluorescent pigments and mixtures thereof.

5. The coating material of claim 1, wherein the at least one color pigments (B) is selected from the group consisting of organic and inorganic pigments.

6. The coating material of claim 1, further comprising pigments (B) selected from the group consisting of extending, rheology control, scratchproofing, corrosion-protective, transparent, and hiding pigments and mixtures thereof.

7. The coating material of claim 1, wherein the at least one rheological aid (D) comprises salts of polyacrylic acid.

8. The coating material of claim 1, further comprising at least one crosslinking agent, at least one organic solvent, at least one neutralizing agent, and at least one organic or inorganic coatings additive.

9. The coating material of claim 8, wherein the at least one organic or inorganic coatings additive is selected from the group consisting of non-(A) binders curable thermally and/or with actinic radiation, reactive diluents for the thermal curing or actinic radiation curing, UV absorbers, light stabilizers, free-radical scavengers, free-radical polymerization initiators, thermal crosslinking catalysts, photoinitiators and photocoinitiators, slip additives, polymerization inhibitors, defoamers, emulsifiers, wetting agents, dispersants, adhesion promoters, leveling agents, film-forming auxiliaries, non-(D) rheology control additives (thickeners) with the exception of phyllosilicates, flame retardants, siccatives, dryers, antiskinning agents, corrosion inhibitors, waxes, and flatting agents and mixtures thereof.

10. A single-coat color and/or effect paint system comprising the coating material of in claim 1.

11. A substrate comprising the single-coat color and/or effect paint system of claim 10, selected from the group consisting of motor vehicle bodies and parts thereof, the interior and exterior of motor vehicles, interior and exterior architecture, doors, windows, furniture, hollow glassware, small parts, coils, containers, packaging, electrical components, and white goods and combinations thereof 12. A multicoat color and/or effect paint system comprising the coating material of in claim 1.

13. A substrate comprising the multicoat color and/or effect paint system of claim 12, selected from the group consisting of motor vehicle bodies and parts thereof, the interior and exterior of motor vehicles, interior and exterior architecture, doors, windows, furniture, hollow glassware, small parts, coils, containers, packaging, electrical components, and white goods and combinations thereof.

* * * * *